United States Patent
Henningson et al.

(10) Patent No.: US 6,301,350 B1
(45) Date of Patent: Oct. 9, 2001

(54) SYSTEM AND METHOD FOR CALL HANDLING

(75) Inventors: Brent D. Henningson, Mesa; William C. Catellier, Glendale, both of AZ (US); Joshua D. Staller, Littleton, CO (US)

(73) Assignee: Qwest Communications International, Inc., Denver, CO (US)

( * ) Notice: Subject to any disclaimer, the term of this patent is extended or adjusted under 35 U.S.C. 154(b) by 974 days.

(21) Appl. No.: 08/497,721

(22) Filed: Jun. 30, 1995

(51) Int. Cl.⁷ .................................................. H04M 3/42
(52) U.S. Cl. ...................... 379/220.01; 379/207.03; 379/211.02
(58) Field of Search .................. 379/220, 201, 379/207, 211, 200, 67, 88, 89, 220.01, 201.01, 207.03, 211.02, 67.1, 88.18, 88.04

(56) References Cited

U.S. PATENT DOCUMENTS

| | | | |
|---|---|---|---|
| 3,737,587 | 6/1973 | Romero | 379/210 |
| 4,680,785 | 7/1987 | Akiyama et al. | 379/57 |
| 4,763,353 | 8/1988 | Canale et al. | 379/157 |
| 4,893,328 | 1/1990 | Peacock | 379/67 |
| 4,951,310 | 8/1990 | Honda et al. | 379/266 |
| 5,036,535 | 7/1991 | Gechter et al. | 379/210 |
| 5,151,929 | 9/1992 | Wolf | 379/57 |
| 5,168,515 | 12/1992 | Gechter et al. | 379/265 |
| 5,208,848 | 5/1993 | Pula | 379/67 |
| 5,237,604 | 8/1993 | Ryan | 379/220 |
| 5,247,571 | 9/1993 | Kay et al. | 379/207 |
| 5,260,986 | 11/1993 | Pershan | 379/57 |
| 5,329,578 | * 7/1994 | Brennan et al. | 379/201 |
| 5,377,186 | * 12/1994 | Wegner et al. | 379/207 |
| 5,418,844 | * 5/1995 | Morrisey et al. | 379/207 |
| 5,422,941 | * 6/1995 | Hasenauer et al. | 379/207 |
| 5,425,090 | * 6/1995 | Orriss | 379/207 |
| 5,436,957 | * 7/1995 | McConnell | 379/207 |
| 5,448,633 | * 9/1995 | Jamaleddin et al. | 379/207 |
| 5,479,495 | * 12/1995 | Blumhardt | 379/207 |
| 5,533,115 | * 7/1996 | Hollenbach et al. | 379/207 |
| 5,553,119 | * 9/1996 | McAllister et al. | 379/207 |

OTHER PUBLICATIONS

"U S West Rolls Out AIN Variety Pack," Advanced Intelligent News, Jun. 15, 1994, vol. 4, No. 12.

* cited by examiner

*Primary Examiner*—Ahmad Matar
*Assistant Examiner*—William J. Deane, Jr.
(74) *Attorney, Agent, or Firm*—Brooks & Kushman P.C.

(57) ABSTRACT

An automated system and method for call handling includes a signal generator such as an Intelligent Services Peripheral (ISP) for generating a call handling request signal representing selected parameters of a call. The signal is directed for receipt by an Integrated Service Control Point (ISCP) or other suitable AIN component which is provided in communication with or includes storage means for storing (a) a unique Service Number for each of a plurality of subscriber calling numbers, and (b) a corresponding Service Profile (call forwarding profile). Each call forwarding profile comprises a plurality of Destination Numbers each assigned a calling day, a calling time and a calling priority designation. The call handling request signal is processed at the ISCP to generate (a) a list of Destination Numbers to route the call to, and (b) a corresponding routing order for the day and time the call is placed. The call is sequentially routed to the selected Destination Numbers in accordance with their predetermined calling priority designations.

8 Claims, 11 Drawing Sheets

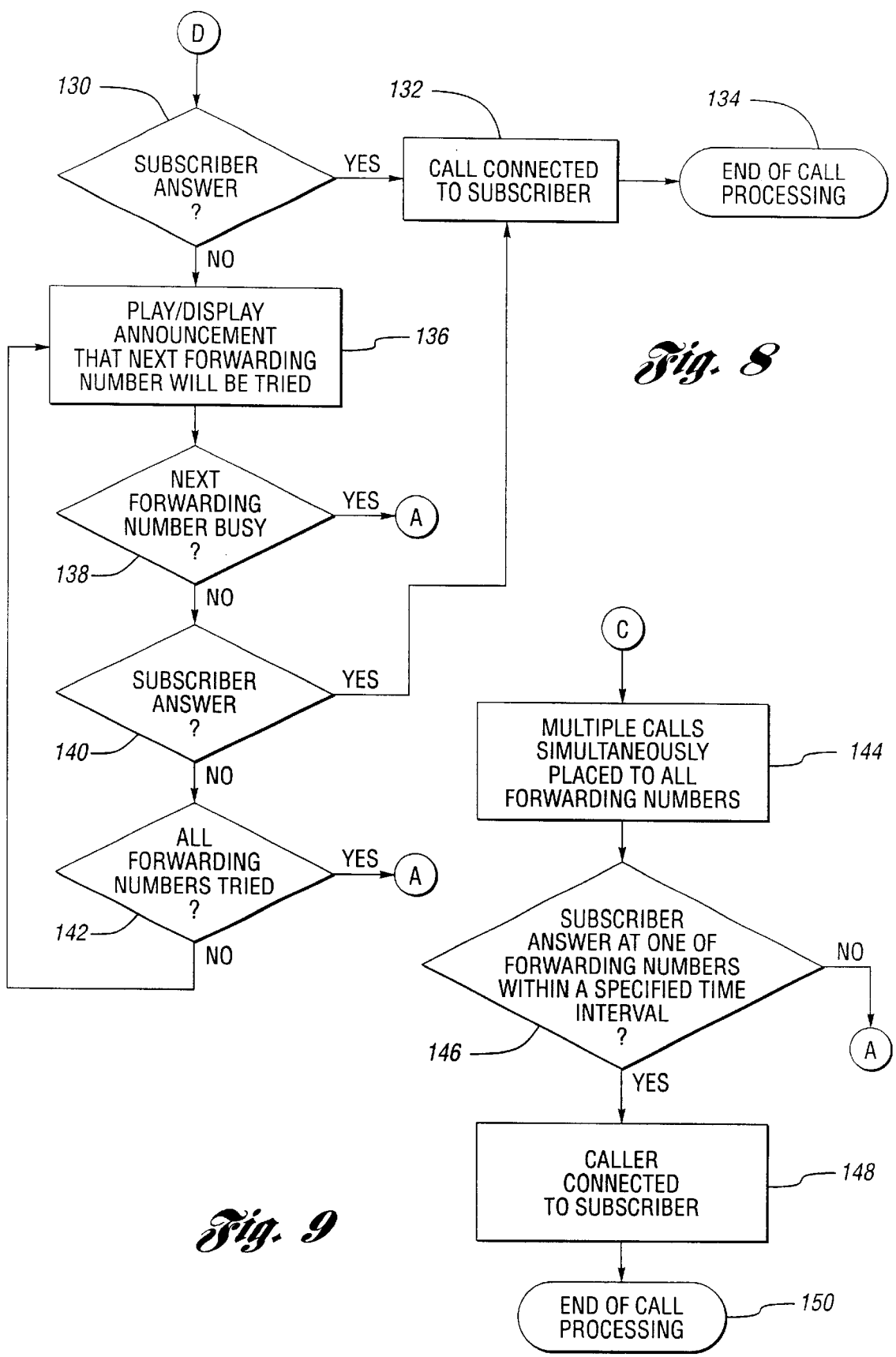

SYSTEM AND METHOD FOR CALL HANDLING

TECHNICAL FIELD

This invention relates generally to Advanced Intelligent Network (AIN) services and, more particularly, to an automated system and method for call handling.

BACKGROUND ART

It is commonplace today for owners and employees of even a small business to be accessible to receive telephone calls and/or messages at numerous exchanges and geographic locations. For example, depending upon the day and time of the call, i.e., business versus non-business hours, a person may be reached at one or more exchanges at one or more offices, in one or more vehicles, via portable telephone (s), by pager(s), at one or more home(s), at a relative or friend's house, etc. As readily seen, for a given person, the list of accessible numbers may be endless.

Several attempts have been made in the prior art to develop call handling systems which forward calls to predetermined locations. Such systems are generally switch-based, provide routing to a single destination number (or only one number at a time), and do not allow the subscriber to easily and directly create and modify a routing "profile." One such system is known as Call Forward Don't Answer (CFDA) service and is a call management feature of the Bell Communications Research (Bellcore) Custom Local Area Signaling System generally referred to by the acronym CLASS$^{SM}$. The CLASS$^{SM}$ system is a switch-based system that relies on Signaling System No. 7. (SS7) capabilities to provide Advanced Intelligent Network services such as equal access 800 dialing and private virtual networks. CLASS$^{SM}$ is generally directed to residential subscribers and provides them with many of the enhanced features previously available only with Private Branch Exchanges (PBXs) or Centrex services.

See also, U.S. Pat. No. 5,237,604 to Ryan; U.S. Pat. No. 5,208,848 to Pula; U.S. Pat. No. 4,893,328 to Peacock; U.S. Pat. No. 5,036,535 to Gechter et al.; U.S. Pat. No. 5,168,515 to Gechter et al.; U.S. Pat. No. 5,247,571 to Kaye et al.; U.S. Pat. No. 4,951,310 to Honda et al.; U.S. Pat. No. 5,260,986 to Pershan; U.S. Pat. No. 4,680,785 to Akiyama et al.; U.S. Pat. No. 5,151,929 to Wolf; U.S. Pat. No. 3,737,587 to Romero; and U.S. Pat. No. 4,763,353 to Canale et al.

DISCLOSURE OF THE INVENTION

It is the principal object of the present invention to provide an improved system and method for call handling.

Another object of the present invention is to provide a system and method for automatically forwarding a call to a plurality of predetermined destination numbers in accordance with a subscriber's predetermined service profile.

According to the present invention, then, a system and method for automated call handling is provided.

The system includes architecture for processing incoming calls from third parties (to subscribers) and outgoing calls from subscribers (to create/modify their respective Service Profiles). The architecture of the incoming call portion of the present invention comprises signal generation means for generating a call handling request signal representing selected parameters of a call. There is further provided storage means for storing a unique Service Number for each of a plurality of subscriber Calling Numbers (telephone numbers). The storage means is also operative to store a corresponding Service Profile (call forwarding profile) with each Service Profile comprising a plurality of Destination Numbers (DNs) which in turn are each assigned a calling day, a calling time, and a calling priority designation. Processing means is further provided for processing the call handling request signal and the subscriber Service Profile so as to generate a list of Destination Numbers to route the call to as well as a corresponding routing order for the day and time the call is placed.

In the preferred embodiment, the processing means of the incoming call architecture further comprises means for determining the subscriber Calling Number as well as the day and time of the call from the call handling request signal. The processing means further comprises means for identifying the Service Number and Service Profile which corresponds to the subscriber Calling Number. Yet still further, the processing means comprises means for comparing the calling day and calling time of each Destination Number of the Service Profile to the day and time of the call. Finally, the processing means comprises means for selecting each Destination Number whose calling day and calling time match the day and time of the call. Routing means is also provided for sequentially routing the call to the selected Destination Numbers in accordance with their calling priority designations. In the preferred embodiment, the signal generation means, storage means, processing means and routing means include components of the AIN. Preferably, but not necessarily, the signal generation means is an Intelligent Services Peripheral (ISP) and the processing means is an Integrated Service Control Point (ISCP).

In keeping with the invention, architecture of the outgoing call portion (subscriber profile creation/modification) of the present invention comprises signal generation means for generating a call handling request signal representing selected parameters of a call. Storage means is also provided for storing a unique Service Number and a unique Security Code for each of a plurality of subscriber Calling Numbers (telephone numbers). The storage means is also operative to store a corresponding Service Profile for each Service Number and its corresponding security code. Still further, processing means is provided for processing the call handling request signal to locate the corresponding Service Profile.

In the preferred embodiment, the processing means of the outgoing call architecture further comprises means for determining a subscriber's Calling Number and Security Code from the call handling request signal. Still further, the processing means comprises means for comparing the determined Security Code to the stored Security Code corresponding to the subscriber's determined Calling Number so as to verify the subscriber service. The outgoing call architecture further comprises playing means for playing selected announcements to the subscriber as well as collection means for collecting selected digits so as to create and modify the Service Profile. In the preferred embodiment, the signal generation means, storage means, processing means, playing means, and collection means are elements of the AIN. Preferably, but not necessarily, the signal generation means is an ISP and the processing means is an ISCP.

The automated method of the incoming call portion of the present invention comprises generating a call handling request signal representing selected parameters of a call. The method further comprises providing storage means for storing a unique Service Number for each of a plurality of subscriber Calling Numbers and a corresponding Service Profile (call forwarding profile). As in the above-described architecture, each of the Service Profiles comprise a plurality of Destination Numbers each assigned a calling day, a calling time, and a calling priority designation. The method further comprises processing the call handling request signal and the subscriber Service Profile so as to generate a list of Destination Numbers to route the call to and a corresponding routing order for the day and time the call was placed.

In the preferred embodiment, the processing comprises determining the subscriber Calling Number, and the day and the time of the call from the call handling request signal. The processing further comprises identifying the Service Number and Service Profile corresponding to the subscriber Calling Number. Still further, the processing comprises comparing the calling day and calling time of each Destination Number of the call forwarding profile to the day and time of the call. Finally, the method comprises sequentially routing the call to the selected Destination Numbers in accordance with their calling priority designations. The steps of generating, providing, processing and routing are performed via components of the AIN. Preferably, but not necessarily, the step of generating a call handling request signal is performed by an ISP and the step of processing the call handling request signal and the subscriber call forwarding profile is performed by an ISCP.

The automated method of the outgoing call portion of the present invention (Service Profile creation/modification) comprises generating a call handling request signal representing selected parameters of the call. The method further comprises providing storage means for storing a unique Service Number and Security Code for each of the plurality of subscriber Calling Numbers and a corresponding Service Profile. Still further, the method comprises processing the call handling request signal to locate the corresponding Service Profile.

In the preferred embodiment, the processing steps further comprise determining the subscriber's Calling Number and Security Code from the call handling request signal and comparing the determined Security Code to the stored Security Code corresponding to the subscriber's determined Calling Number to verify subscriber service. Finally, the method comprises playing selected announcements to the subscriber and collecting selected digits so as to modify the Service Profile. The steps of generating, providing, processing, playing and collecting are performed via components of the AIN. The step of generating a call handling request signal is preferably, but not necessarily performed by an ISP and the processing steps are preferably, but not necessarily performed by an ISCP.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIGS. 7–14 are logic flow diagrams of the automated method and system for call handling of the present invention;

BEST MODES FOR CARRYING OUT THE INVENTION

Figure 1:
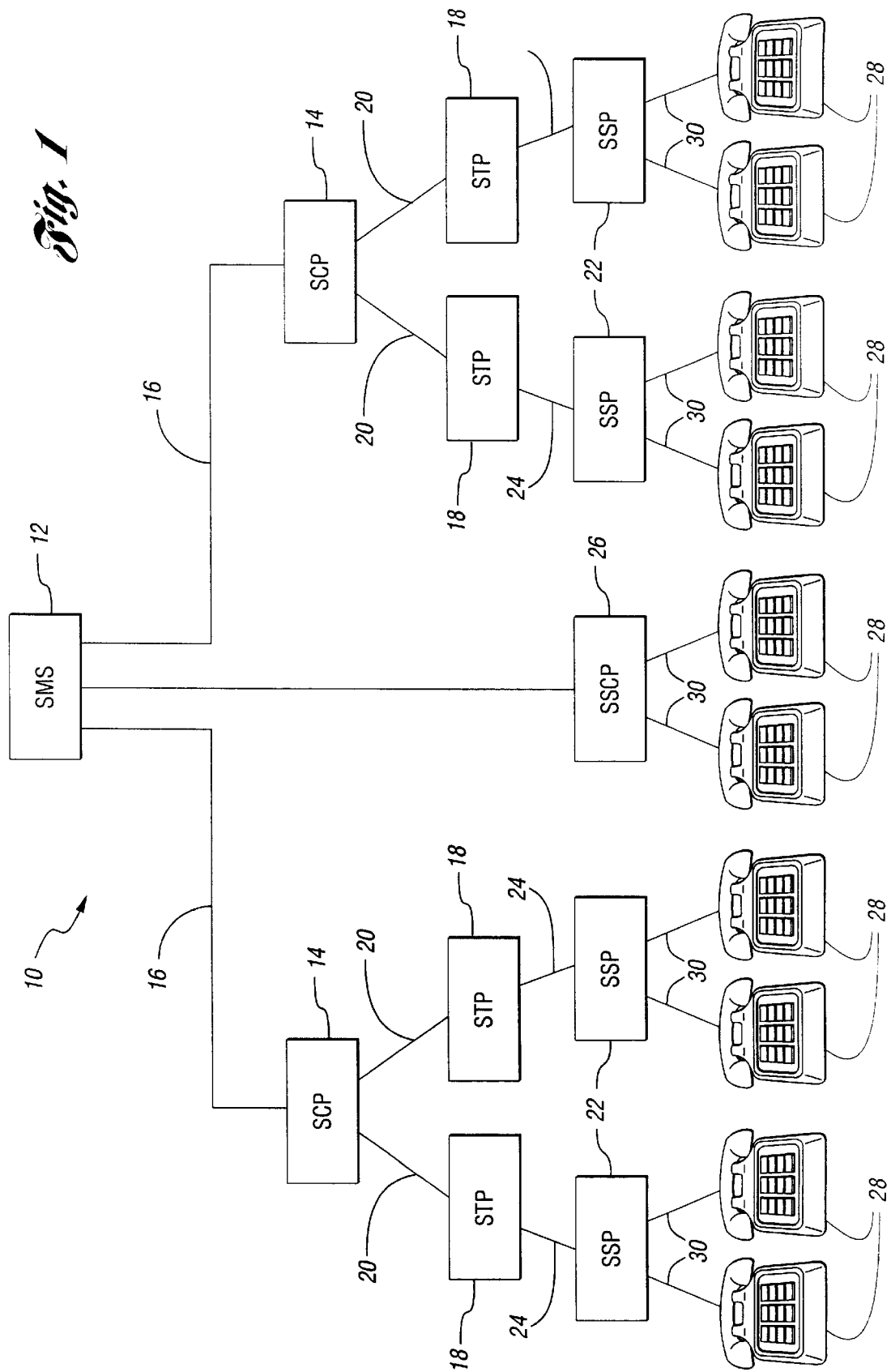
FIG. 1 is a representative diagram of an Advanced Intelligent Network (AIN)

With reference to FIG. 1, a representative diagram of an Advanced Intelligent Network (AIN) architecture is shown for use in a Public-Switched Telephone Network (PSTN). The AIN architecture referred to is designated generally by reference numeral 10 and is comprised of various packet switching elements and transmission links, some of which are depicted in FIG. 1.

As seen therein, a Service Management System (SMS) 12 is provided which generally comprises a computer-based system used to design service logic, to control logic implementation to the network, and to manage the network operation, such as monitoring traffic levels and collecting statistics and billing data. The SMS 12 is provided in communication with a plurality of Service Control Points (SCPs) 14 via management links 16. As those skilled in the art will recognize, SCPs 14 are nodes which contain the service logic and associated data support to execute the required customer services.

Still referring to FIG. 1, Signal Transfer Points (STPs) 18 are provided in communication with SCPs 14 via signal links 20. STPs 18 are packet switches used to route signaling messages within the network. Still further, Service Switching Points (SSPs) 22 are provided in communication with STPs 18 via signal links 24. Again, as those skilled in the art will recognize, SSPs 22 are generally nodes that recognize the "triggers" used when a subscriber invokes an intelligent network service and then communicate with the SCPs 14 to operate that service. In limited traffic situations, Service Switching and Control Points (SSCPs) 26 are also provided for combining the functions of the SCPs 14 and SSPs 22. Finally, subscribers 28 communicate with SSPs 22 via lines 30.

Figure 2:
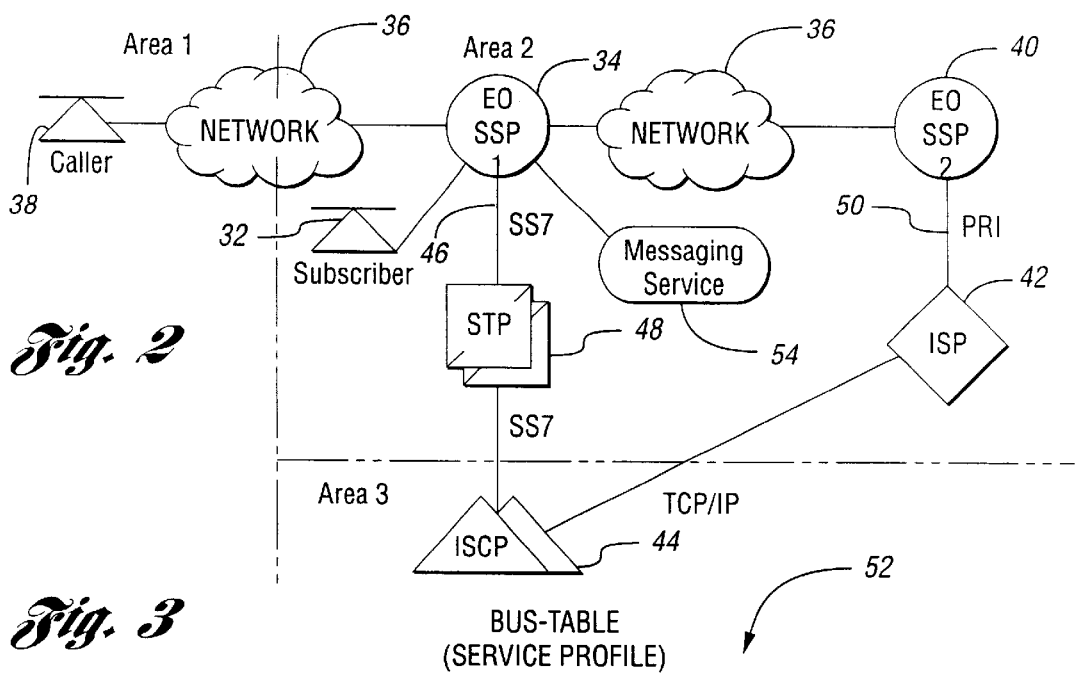
FIG. 2 is a schematic diagram of the architecture (incoming calls) of the automated call handling system of the present invention.

Turning now to FIG. 2, there is shown a generalized schematic diagram of the architecture of the automated system for call handling of the present invention. FIG. 2 illustrates the possible locations for the network components involved in the call. It should be noted that the areas identified could all be in the same Local Access and Transport Area (LATA), each could be in a different LATA, or some combination in-between. The schematic diagram shown is used to implement the FindMe$^{SM}$ call handling services of the invention. As described more thoroughly herein, FindMe$^{SM}$ provides the capability for callers to dial a single number and reach subscribers at virtually any location, including separate locations for business and non-business hours. If a subscriber cannot be reached, FindMe$^{SM}$ can place the caller on hold and page the subscriber. Alternatively, if the subs-scriber is paged, FindMe$^{SM}$ provides a paging capability, where the sub-scriber can dial in and, in a preferred embodiment, be connected directly with the caller. Subscriber's can customize and control their FindMe$^{SM}$ profile by calling in using a touch-tone or screen phone and change the locations where they can be reached, change business hours, and even direct FindMe$^{SM}$ to send all calls to a specific location.

Throughout this document, the following terms will be used:

| TERM | DEFINITION |
| --- | --- |
| Access Number | An existing telephone number used by the subscriber to forward calls to their Service Number. |
| Caller | Any network user dialing a subscriber's telephone number. |
| Default Location | A location, either a telephone number, voice mail, or standard announcement, into which callers will be routed if the subscriber cannot be located. |
| Destination Number | A terminating directory number selected by the subscriber as part of his/her Service Profile. |
| Forwarding List | One of a plurality of telephone numbers that the service will call in order to locate the subscriber. |
| Service Profile | Subscriber information, one for each subscriber, and consists of such things as a status of the FindMe $^{SM}$ service (on or off), FindMe $^{SM}$ forwarding lists and business hours. |
| Originating Switch | The central office switch which serves the caller. |
| Administration Number | A telephone number used by FindMe $^{SM}$ service subscribers to change their profile. |
| Page Number | A telephone number used by FindMe $^{SM}$ paging subscribers to connect to paging callers (same as administration number). |
| Service Number | A new telephone number unique to the subscriber which will access FindMe $^{SM}$ service. |
| Subscriber | A customer who is assigned the FindMe $^{SM}$ services. |
| Terminating Switch | The central office switch which serves the destination number retrieved from the subscriber's forwarding profile. |
| Calling Number | The telephone number of the subscriber. |

Users of the system may be classified as (1) subscribers accessing Dual Tone Multi-Frequency (DTMF) menus, (2) callers invoking the service by dialing the subscriber, (3) subscribers connecting to a caller using Anywhere Call Pick-up (ACP basic or ACP connection), or (4) system administrators provisioning/maintaining the service.

The diagram of FIG. 2 represents the architecture for calls incoming to a subscriber 32. The architecture includes elements of the AIN. Thus, subscriber 32 is provided in communication with end office (SSP) 34 which, in turn, is provided in communication with a caller 38 and a second end office (SSP) 40 via networks 36. End office 40 is in communication with Intelligent Services Peripheral (ISP) 42 which, in turn, is provided in communication with Integrated Service Control Point (ISCP) 44 via Transmission Control Protocol/Internet Protocol (TCP/IP). ISCP 44 includes or is provided in communication with a database or similar storage means for storing a unique Service Number for each of a plurality of subscriber Calling Numbers and a corresponding call forwarding profile. End office 34 is in communication with Signal Transfer Point (STP) 48 via Signaling Service No. 7 (SS7) link 46.

In operation, a caller dials a subscriber's Service Number. Thereafter, a check is made to see if the subscriber has turned the FindMe $^{SM}$ service on or off. It should be noted that each subscriber will receive their own Service Number. If the subscriber, however, wishes to use an existing telephone number for FindMe $^{SM}$, the subscriber's line will be provisioned with Call Forward Don't Answer (CFDA) functionality, a CLASS call management feature referenced above. At the switch serving the subscriber, end office 34, the CFDA is translated against the access line and after a specified number of rings (preferably three), the call is forwarded to the ISP 42 over primary rate Integrated Services Digital Network (ISDN) line 50.

Thereafter, ISP 42 sends a message (call handling request signal) to ISCP 44 requesting instructions on how to handle the call. The ISCP 44 uses the called number (the subscriber's telephone number) to identify the subscriber's FindMe $^{SM}$ Service Number so as to verify the status of the service and load the needed call variables for the service. ISCP 44 then performs a "look-up" in the subscriber's Service Profile and determines the on/off status of the subscriber's service. As referenced above, ISCP 44 includes or is provided in communication with a database or similar storage means for storing the subscriber's Service Profile. If the service is off, ISCP 44 sends a response to ISP 42 to route the call to a Default Location. As discussed herein, the Default Location can be a messaging service, i.e., voice mail, etc. or one or more alternative Destination Numbers.

If the service is on, ISCP 44 sends a message to ISP 42 to play or display a subscriber's selected announcement (greeting) to the caller 38. If subscriber 32 has Single Number Sequencing (SNS) or Multiple Location Sequencing (MLS), ISCP 44 sends a message to ISP 42 instructing it, through a series of message exchanges, to originate a call to the first number in a BUS-Table. In accordance with the invention, ISCP 44 furnishes this number.

Figure 3:
FIG. 3 is a schematic diagram of a sample BUS-table used in accordance with the system and method of the present invention.

A representative BUS-Table is shown, for example, in FIG. 3 and designated generally by reference numeral 52. BUS-table 52 provides relevant information for the subscriber's Service Profile as stored in a database or similar storage means which, in turn, is incorporated in or provided in communication with ISCP 44. The BUS-table includes the subscriber's Calling Number 55, the subscriber's Service Number 56, and the subscriber's Security Code 58. Table 52 further includes a plurality of Destination Numbers, each of which is assigned a calling day, a calling time, and a calling priority designation. It should be understood that table 52 is simplified for explanation purposes and, therefore, has been arranged to show business hours priority and non-business hours priority. Applicants contemplate, however, that more elaborate tables could be implemented to achieve the same purpose.

In the example shown, Destination Number D1 has been assigned calling priority 1 for business hours designated as 9:00 a.m. to 5:00 p.m. EST, Monday-Friday. For non-business hours, nominally designated 5:00 p.m. to 11:00 p.m. Monday-Friday and 9:00 a.m. to 5:00 p.m. Saturday and Sunday, D1, an office number, has not been optioned at all. D2, an alternative office number, has been designated calling priority 2 for business hours and as in the case of D1, not optioned at all for non-business hours. Destination D3, a home telephone number, has been designated calling priority 3 for business hours. In contrast, D3 has been designated as calling priority 1 during non-business hours. D4, a first mobile telephone, has been designated as calling priority 4 during business hours and calling priority 2 during non-business hours. Likewise, second mobile telephone number D5 has been designated as calling party 5 during business hours and calling priority 3 during non-business hours. Finally, destination number D6, a pager, has been designated as calling priority 6 during business hours and calling priority 4 during non-business hours. As readily seen, the variations which may be implemented in BUS-table 52 are endless and may be custom created and modified by the subscriber to fit his or her own unique schedule.

Referring still to FIG. 2, it should be understood that the ISCP 44 furnishes the prioritized Destination Numbers from table 52 and connects the caller and the called party (subscriber) when the line is answered. If there is no answer at the first location (the first prioritized Destination Number), and the subscriber has Multiple Location Sequencing (MLS), ISCP 44 instructs ISP 42 to route the call to the next prioritized number in table 52.

If the line is busy, ISCP 44 instructs ISP 42 to play/display an announcement indicating a busy line. If the subscriber does not have FindMe<sup>SM</sup> paging, ISCP 44 sends an instruction to ISP 42 to route the call to a Default Location. As referenced above, this may be a messaging service 54 or a final route to telephone number. If the subscriber has FindMe<sup>SM</sup> paging, ISCP 44 sends an instruction to ISP 42 to play/display an announcement asking the caller if they wish to have the subscriber paged and, if so, requests the paging number. If the caller provides a positive response, ISCP 44 instructs ISP 42 to originate a call to page the subs-scriber.

If the subscriber has Multiple Location Ringing (MLR), ISCP 44 sends a message to ISP 42 instructing it, through a series of message exchanges, to originate a call to all the numbers in the BUS-table 52 at the same time, regardless of the preselected priority designation. ISCP 44 furnishes these numbers and connects the caller and called party with any one of the lines which is first answered. If any line is busy, ISP 42 will disconnect it. If the subscriber does not have FindMe<sup>SM</sup> paging, ISCP 44 sends an instruction to ISP 42 to route the call to the default location.

Figure 4:
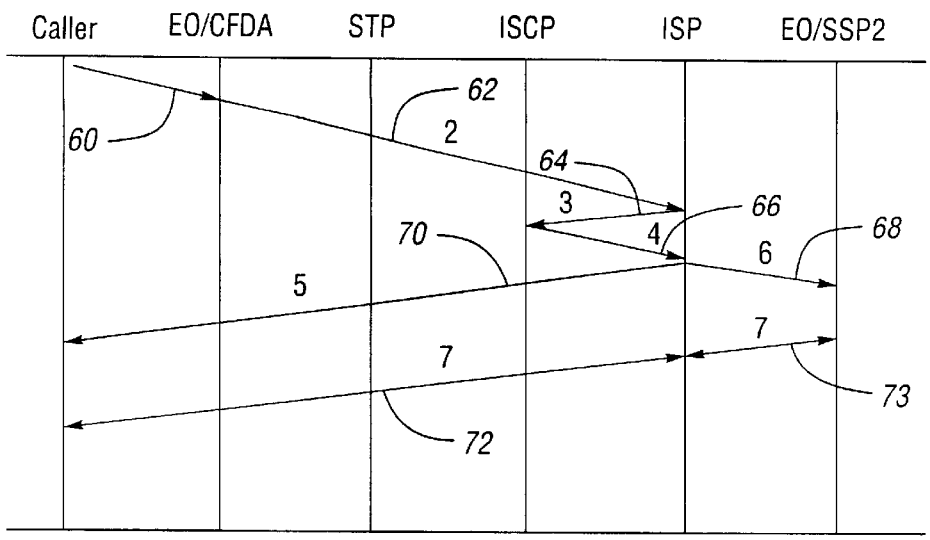
FIG. 4 is a schematic diagram of representative message exchanges of the architecture of FIG. 2.

The message exchanges for calls incoming to a subscriber, as discussed above, are shown in FIG. 4. As illustrated at 60, the caller dials the subscriber's telephone number (calling number). At 62, the subscriber's switch using CFDA routes the call to the ISP. At 64, the ISP sends the message "Provide Instructions" to the ISCP. Thereafter, at 66, the ISCP sends the message "CallInfoToResource" with "IPStayOnLine=True." At 68, the ISP then plays/displays an announcement to the caller. Still further, at 70, the ISP originates a call to number provided in "CallInfoToResource." Finally, at 72, the ISP connects the caller to the subscriber's telephone number and at 73, the ISP sends the message "ResourceClear" to the ISCP.

Figure 5:
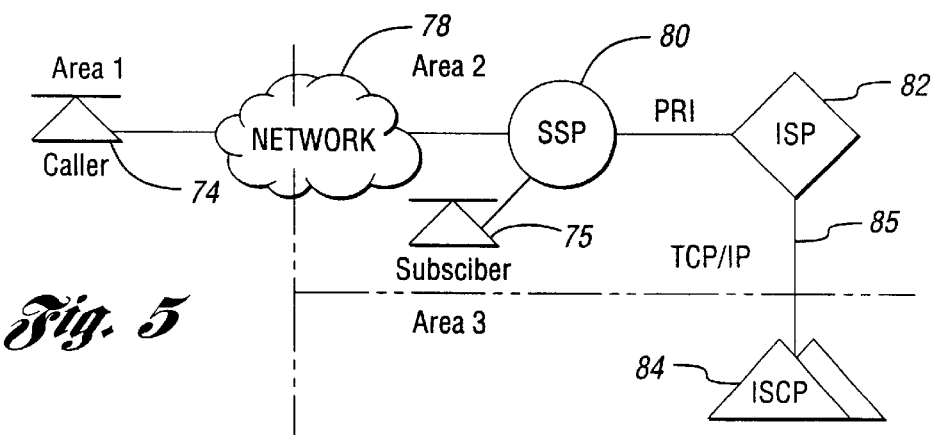
FIG. 5 is a schematic diagram of the architecture (subscriber profile modification) of the call handling system of the present invention.

Turning now to FIG. 5 of the drawings, there is shown a schematic diagram of the architecture for Service Profile updates used in accordance with the present invention. As shown, a caller 74 is provided in communication with end office (SSP) 76 via network 78. SSP 76, in turn, is provided in communication with ISP 82 via a PRI line 80. Finally, ISP 82 is provided in communication with ISCP 84 via Transmission Control Protocol/Internet Protocol (TCP/IP) line 85. As referenced above, ISCP 84 includes or is provided in communication with a database or similar storage means for storing a unique Service Number for each of a plurality of subscriber Calling Numbers and a corresponding Service Profile. The Service Profile comprises a plurality of Destination Numbers, each assigned a calling day, a calling time and a calling priority designation.

For subscriber DTMF access, a local number (an Administration Number) is provided in each calling area for subscribers to dial in order to listen to or make changes to their Service Profiles associated with their FindMe<sup>SM</sup> service. Of course, if a screen phone or similar adaptation is used, the subscriber could be provided a visual display of his or her service as well. Likewise, a calling party could be prompted for information and provided announcements in the form of visual displays when attempting to connect a call to a subscriber.

When a subscriber 75 dials the local number referenced above, the call is routed to ISP 82. ISP 82 provides the announcements required in the DTMF menus. If ISP 82 is not within the same local area as the subscriber, a Market Expansion Line (MEL) may be used to route the call out of the subscriber's local area to ISP 82. When a call is routed to ISP 82, it sends a message to ISCP 84 requesting instructions on how to handle the call. ISCP 84 returns a message to ISP 82, informing ISP 82 to prompt the subscriber for its area code and telephone number.

After collecting the information from the subscriber, ISP 82 returns the requested data to ISCP 84 by cross-referencing the telephone number to a stored list of system subscribers (and corresponding telephone numbers). ISCP 84 verifies that the caller is, in fact, a subscriber, i.e., she has the FindMe<sup>SM</sup> service. Following verification, ISCP 84 then instructs the ISP 82 to prompt the subscriber for her Security Code. ISP 82 collects the requested information and returns the data to ISCP 84. ISCP 84 compares the entered Security Code with the Security Code associated with the subscriber's telephone number.

Upon successful verification, ISCP 84 determines the subscription for the subscriber via FindMe<sup>SM</sup> service or one of the other AIN products. ISCP 84 instructs ISP 82, through a series of message exchanges, the announcements to play/display to the subscriber and digits to collect from the subscriber for the specific subscription. At this point in the call, digits collected by the subscriber may result in changes to the subscriber's Service Profile.

As in the case of the architecture for calls incoming to a subscriber, ISP 82 could be located in a different area from the subscriber 75. If so, an MEL must provide a local access point for subscribers. The area identified could all be in the same LATA, each could be in a different LATA, or some combination in-between.

Figure 6:
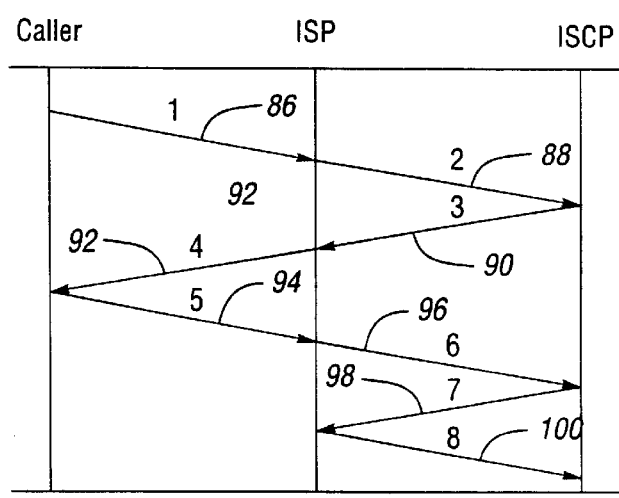
FIG. 6 is a schematic diagram of representative message exchanges of the architecture of FIG. 5.

The message exchanges for Service Profile updates are shown in FIG. 6. At 86, the caller dials a local number from the DTMF interface and the call is routed to the ISP. At 88, the ISP sends a "ProvideInstructions" message to the ISCP. Still further, at 90, the ISCP sends a "CallInfoToResource" with "IPStayOnLine=True" to the ISP. Continuing, at 92, the ISP plays an announcement to the caller. At 94, the caller enters requested digits and at 96 the ISP sends a "CallInfoFromResource" message to the ISCP. Steps 90, 92, 94, and 96 are repeated as needed. In step 90, the ISCP identifies the announcement to play/display and the digits to collect. In step 96, the ISP returns the collected digits. At 98, the ISCP sends "CallInfoToResource" with "IPStayOnLine=False" message to the ISP. Finally, at 100, the ISP terminates the call and sends a "ResourceClear" message to the ISCP.

FIGS. 7–14 illustrate a high level logic flow chart for the automated system and method of the present invention. As indicated above, the FindMe<sup>SM</sup> service described provides the capability for callers to dial a single Service Number in order to locate the subscriber. Each subscriber will receive their own Service Number. If the subscriber wishes to use an existing telephone number for FindMe<sup>SM</sup>, a call forwarding feature (e.g., Call Forward Don't Answer) is used and calls are forwarded to the FindMe<sup>SM</sup> Service Number.

Figure 7:
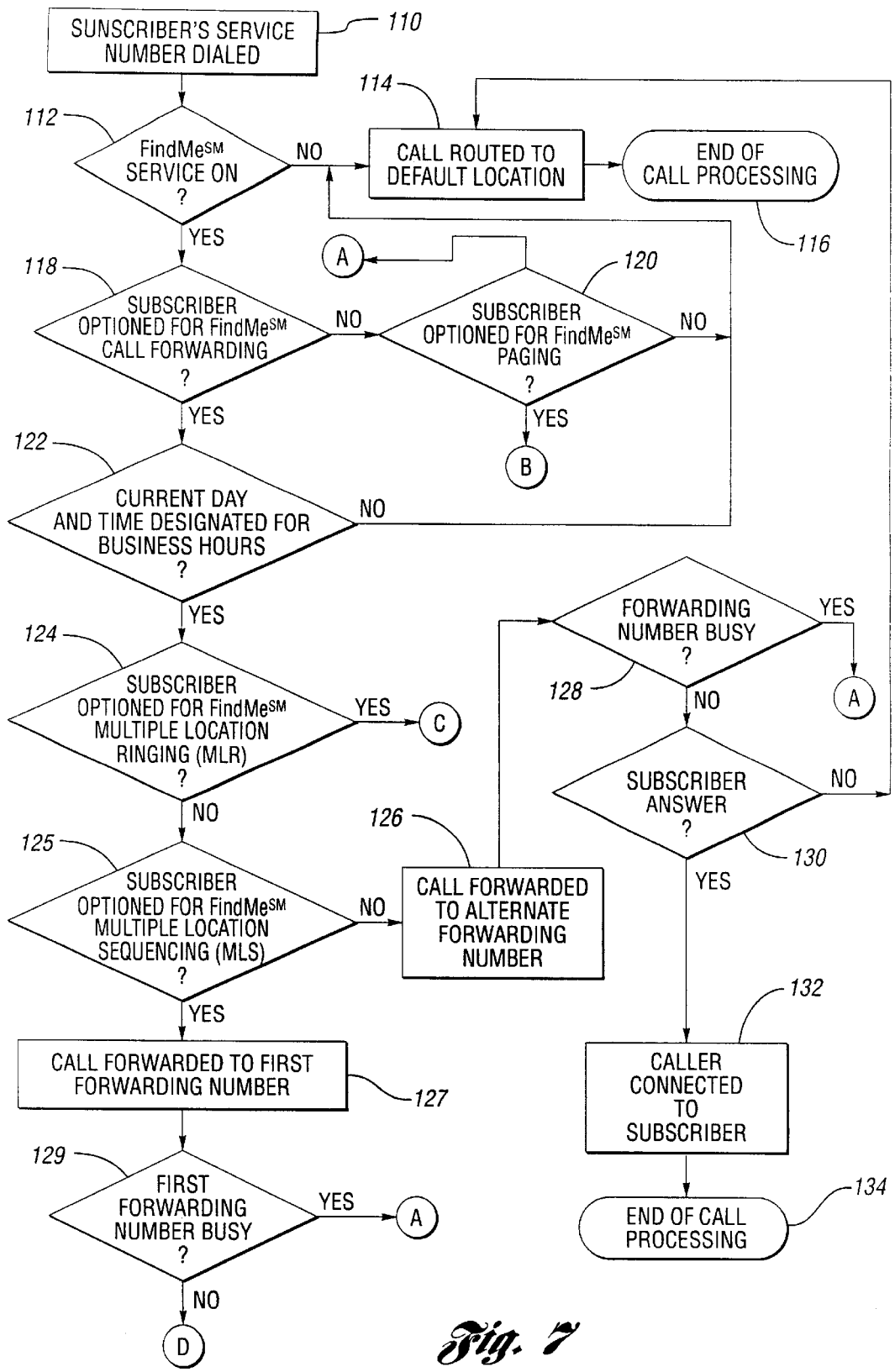

As shown in FIG. 7, after the caller dials the subscriber's Service Number (or is forwarded to the Service Number) 110, a check 112 will be made to see if the subscriber has turned FindMe<sup>SM</sup> on or off. In a preferred embodiment, subscribers may turn FindMe<sup>SM</sup> on or off at any time by calling into FindMe<sup>SM</sup> on their Administration Number from a touch-tone phone, following a voice menu and entering a DTMF key to turn FindMe<sup>SM</sup> on or off as instructed. As indicated above, where a screen phone is utilized, visual inputs, queries and responses will be utilized.

If FindMe<sup>SM</sup> is on, it will attempt to locate the subscriber. If FindMe<sup>SM</sup> is off, callers will be routed 114 to the subscriber's Default Location and call processing will be ended 116. Each subscriber will have their own Default Location. This location can be one of the following: (1) voice mail—callers will be routed to the subscriber's voice mail system and will be placed in the subscriber's voice mailbox; (2) telephone number —callers will be routed to this number; or (3) standard announcement—announcement that will be played/displayed to callers.

Default locations are used throughout FindMe$^{SM}$. For example, assume that the subscriber has specified that they wish their Default Location to be voice mail. If the subscriber cannot be reached, callers will be transferred to the subscriber's voice mail system. Telephone number default locations cannot be set to the subscriber's Service Number or Access Number. The subscriber's default location may be changed only with a service order. If it is determined at decision block 118 that the subscriber is optioned for FindMe$^{SM}$ forwarding (any version), the system will attempt to locate the subscriber as discussed below. If, however, the subs-scriber is not optioned for FindMe$^{SM}$ call forwarding, decision block 120 will determine if the subscriber is optioned for FindMe$^{SM}$ paging and, if so, attempt to locate the subscriber as discussed below. If the subscriber is not optioned for FindMe$^{SM}$ paging, the call will be routed to the default location 114 and call processing will be terminated 116.

Still referring to FIG. 7, if the subscriber is optioned for FindMe$^{SM}$ call forwarding, a determination will be made at designation block 122 if the current day and time has been designated as business or non-business hours. For example, if the subscriber previously designated Monday-Friday, 8:00 a.m. to 5:00 p.m. as business hours, and was called at 6:30 p.m. on a Tuesday, the call would be treated as a non-business hour call and the call would be routed to Default Location 114. If the current day and time has been designated as business hours, a determination will be made at decision block 125 whether the subscriber is optioned for Multiple Location Sequencing (MLS). While applicants contemplate that many numbers may be sequenced, in the preferred embodiment, this number is limited to three, i.e., three different locations where a subscriber may be reached during business hours. If the subscriber is optioned for Single Location Sequencing (SLS), all non-business hour calls will be routed for default treatment 114.

It is contemplated that each location will have a 7 or 10 digit telephone number. FindMe$^{SM}$ will try the first location 126 using business location numbers during business hours. If while attempting to locate the subscriber at a specific location, and that location is busy as determined at decision block 128, the caller will be routed to the subscriber's Default Location 114 or to FindMe$^{SM}$ paging after appropriate decision 120 has been made whether the subscriber is optioned for FindMe$^{SM}$ paging service. If the call is answered as determined at decision block 130, FindMe$^{SM}$ will assume that the subscriber has been located, will connect the caller and the subscriber 132, and will then terminate call processing for that call 134. If there is no answer, the MLS version of FindMe$^{SM}$ will provide an announcement to the caller 136 telling him or her that the system will try the next prioritized Destination Number. Again, if the next Destination Number is busy as determined by decision block 138, the caller will be routed to FindMe$^{SM}$ paging in accordance with determinations made at decision block 120. If, however, the subscriber answers as determined at decision block 140, the caller will be connected to the subscriber and call processing will be discontinued.

If the subscriber is not reached after all the appropriate location numbers have been attempted in their predetermined priority as determined at decision block 142, then the appropriate decision will be made if the subscriber is optioned for FindMe$^{SM}$ paging and, if so, corresponding call handling steps will be taken. If the subscriber is not optioned for FindMe$^{SM}$ paging, the call will be routed to the subscriber's default location 114.

Turning now to FIG. 9, if the subscriber is optioned with Multiple Location Ringing (MLR), the subscriber may have a plurality of destination numbers (preferably three) for which calls may be simultaneously placed 144. The originating party will be connected to the call that is answered first. If the call is answered within a specified time interval as determined at decision block 146, FindMe$^{SM}$ will assume that the subs-scriber has been located, will connect the caller and subscriber as shown at 148 and will terminate processing for that call 150. If there is no answer in the specified time interval, the system will provide an announcement to the caller advising that the party could not be located. If a busy line is encountered, the call attempt to that line will be abandoned.

It is contemplated by applicants that FindMe$^{SM}$ paging will be implemented in two different versions, Anywhere Call Pick-up (ACP) Basic and ACP Connection. ACP connection will be a full functional version of the product. This version will page the subscriber and allow the caller to stay on the line to be connected to the subscriber when the subscriber calls back into the system. The ACP Basic version of the product will automatically deliver the caller's telephone number and page the subscriber. This version of the product does not allow the caller and the subscriber to be connected.

Figure 10:
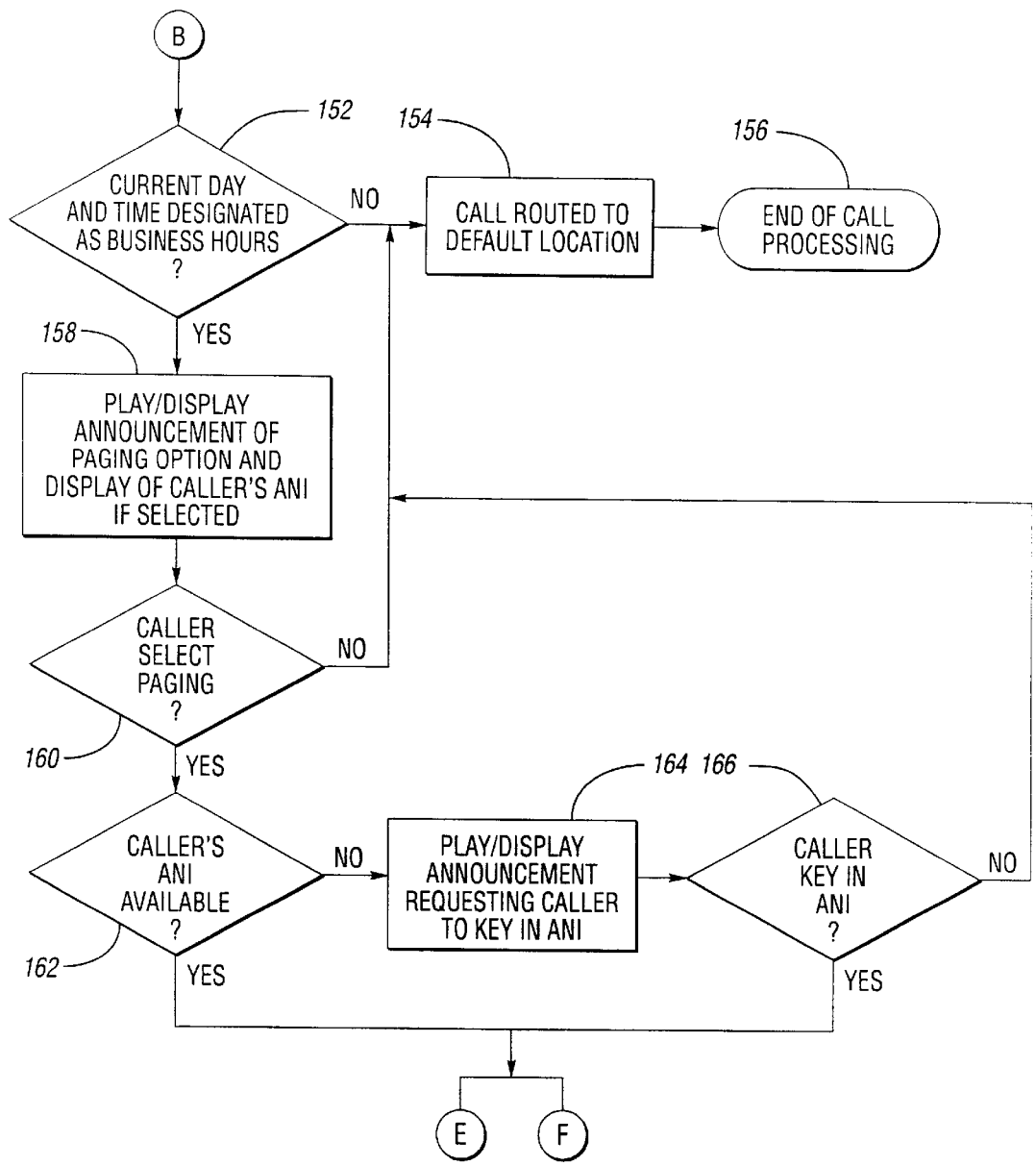
Figure 11:
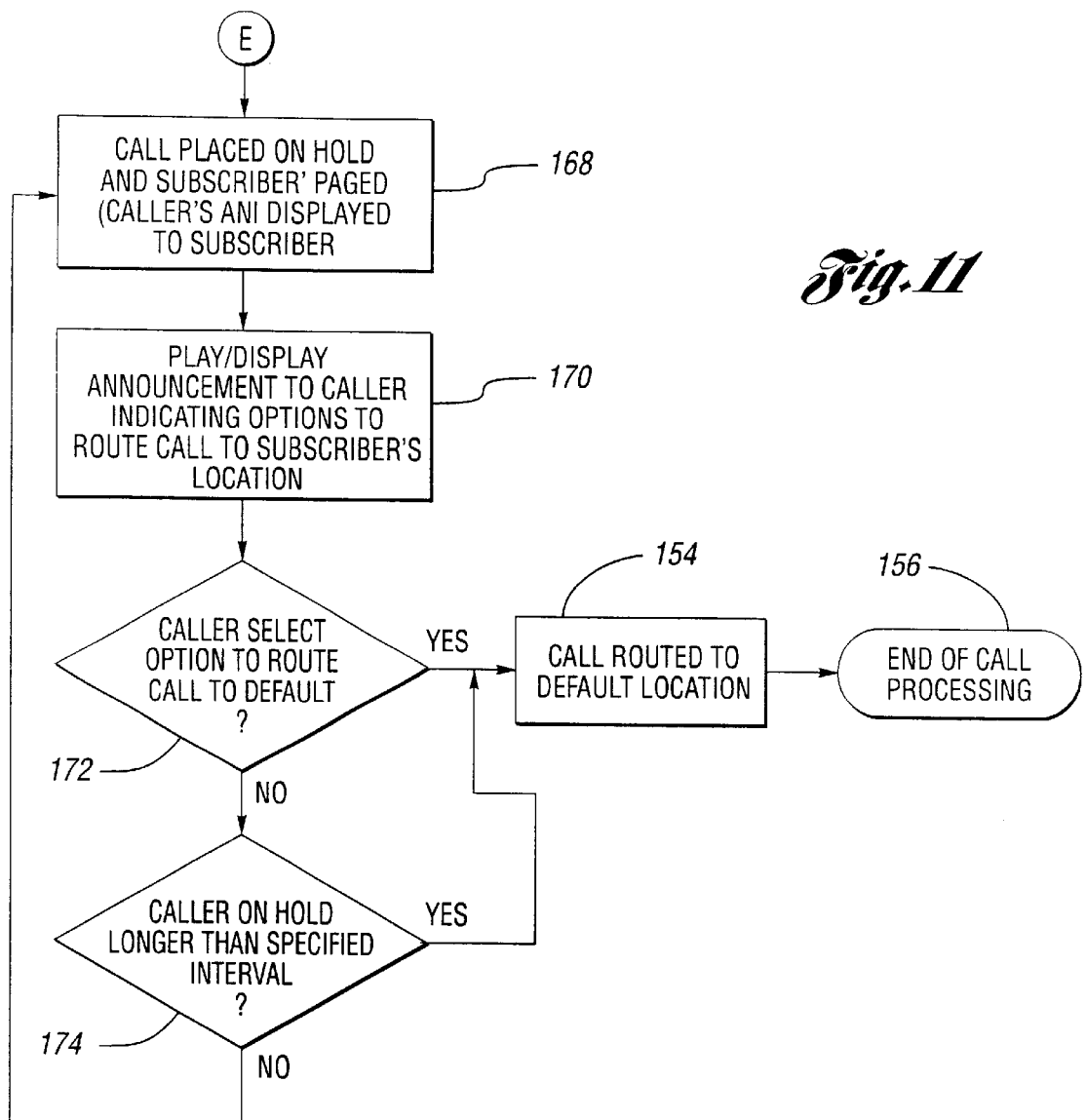
Figure 12:
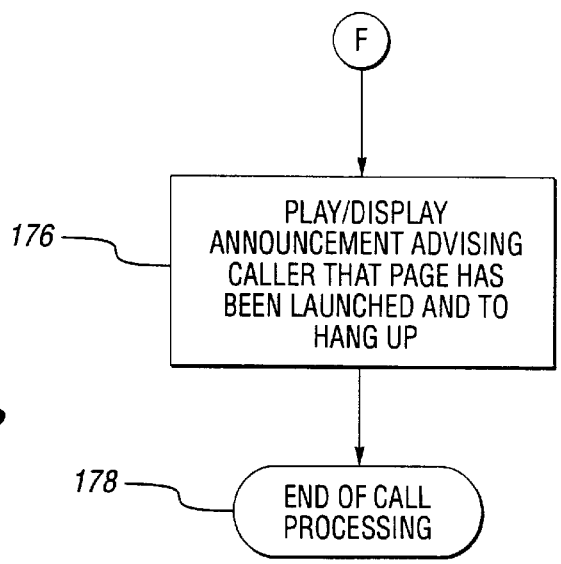

The logic flow for the paging operations is shown in FIGS. 10–12. First, FindMe$^{SM}$ paging will determine if the current day and time has been designated as business hours as determined at decision block 152. If the call is during non-business hours, the call will be routed to the subscriber's default location 154 and call processing will be discontinued 156. If the call is during business hours, the caller may elect to have the subscriber paged as determined at decision block 160 in response to an appropriate announcement 158. The announcement will advise the caller that the calling number will be displayed on the subscriber's paging unit. Any suitable paging system and paging receiver may be used including, for example, a Motorola BRAVO$^{SM}$.

Referring to FIG. 10, if the caller does not select the paging option, the call will be routed to the subscriber's Default Location 154 and call processing will be discontinued 156. Otherwise, FindMe$^{SM}$ will place the caller on hold and attempt to page the subscriber. The caller's Automatic Number Identification (ANI) information will be displayed on the subscriber's pager, prepended by a selected digit such as 1. If the caller's ANI is not available as determined at decision block 162 (i.e., inter-LATA call), the caller will be asked via an appropriate announcement 164 to key-in their ten digit telephone number. If the caller does not enter their telephone number within a specified time interval as determined at decision block 166, the call will be routed to the subscriber's Default Location 154 and call processing will be discontinued 156. If the caller enters the appropriate telephone number, it will then be displayed on the subscriber's pager prepended by the selected digit.

As shown in FIG. 11, for FindMe$^{SM}$ paging connection service, the call will be placed on hold 168 while the subscriber is paged. The system will repetitively play/display an announcement 170 to the caller following the expiration of a specified time interval, for example every 30 seconds, as indicated at block 170 advising the caller that she can press a DTMF key at any time and be routed to the Subscriber's Default Location. If the caller elects default routing as determined at decision block 172, the call will of course be routed to the Default Location 154 and call processing will be discontinued 156. If the caller does not elect default routing, the hold time of the caller will be monitored at decision block 174 and if a specified time interval has elapsed, the call will nonetheless be routed to the Default Location 154.

If after being paged, the subscriber dials the FindMe$^{SM}$ paging number, FindMe$^{SM}$ will play welcome announcement and instruction to enter their ten digit Service Number and four digit Security Code. The FindMe$^{SM}$ paging number is a telephone number that is used for all subscribers that have FindMe$^{SM}$ paging connection, to connect to paging callers. This number is different from Service Numbers but the same as the Administration Number. The subscriber's Service Number code is used for identification. The subscriber's security number functions like a password and should be kept secret.

If the subscriber enters the correct service and Security Code and there is a caller holding for them, FindMe$^{SM}$ will connect a subscriber and caller and will then stop processing for that call. The subscriber will be given a selected-number of chances, for example three, to enter their correct Service Number and Security Code. After three failed attempts to enter either the Service Number or Security Code, the subscriber will be disconnected.

In an alternative embodiment, FindMe$^{SM}$ paging will not connect the caller to the subscriber after launching the page. Instead, an announcement will be played/displayed 176 advising that the page has been launched and to hang up. Call processing will then be discontinued 178.

With both versions of the contemplated service, the subscriber will have the option to hear a list of a selected number of the last telephone numbers, for example 15, corresponding to callers that page them, be transferred to the last caller, be transferred to their default location, or be disconnected, depending upon their selection. If the subscriber listens to the list of numbers, she will have the option to save or delete each individual number. However, even if the number is saved, telephone numbers for any new callers that page the subscriber will replace the oldest numbers, since the list is always the last n numbers.

Figure 13:
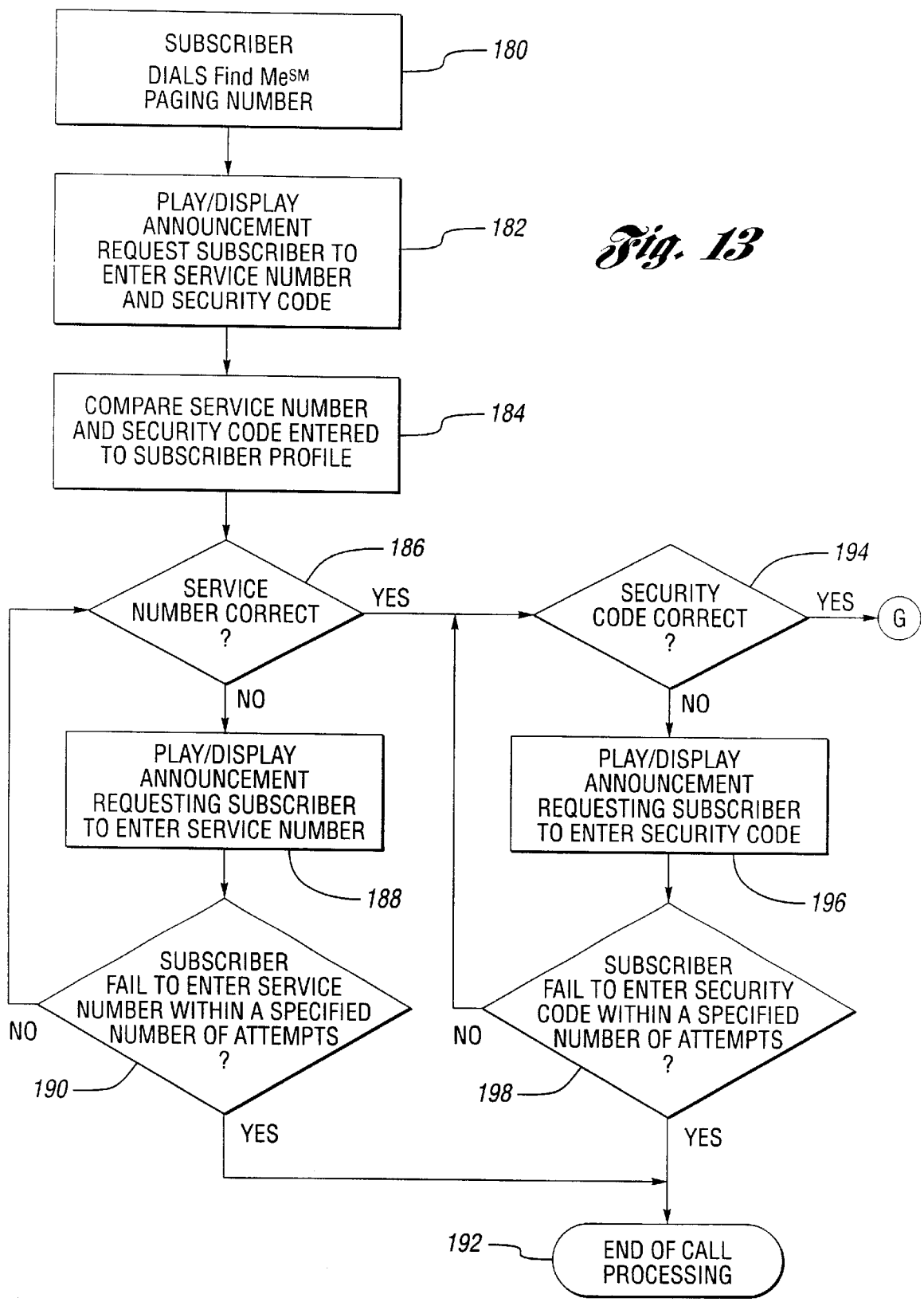
Figure 14:
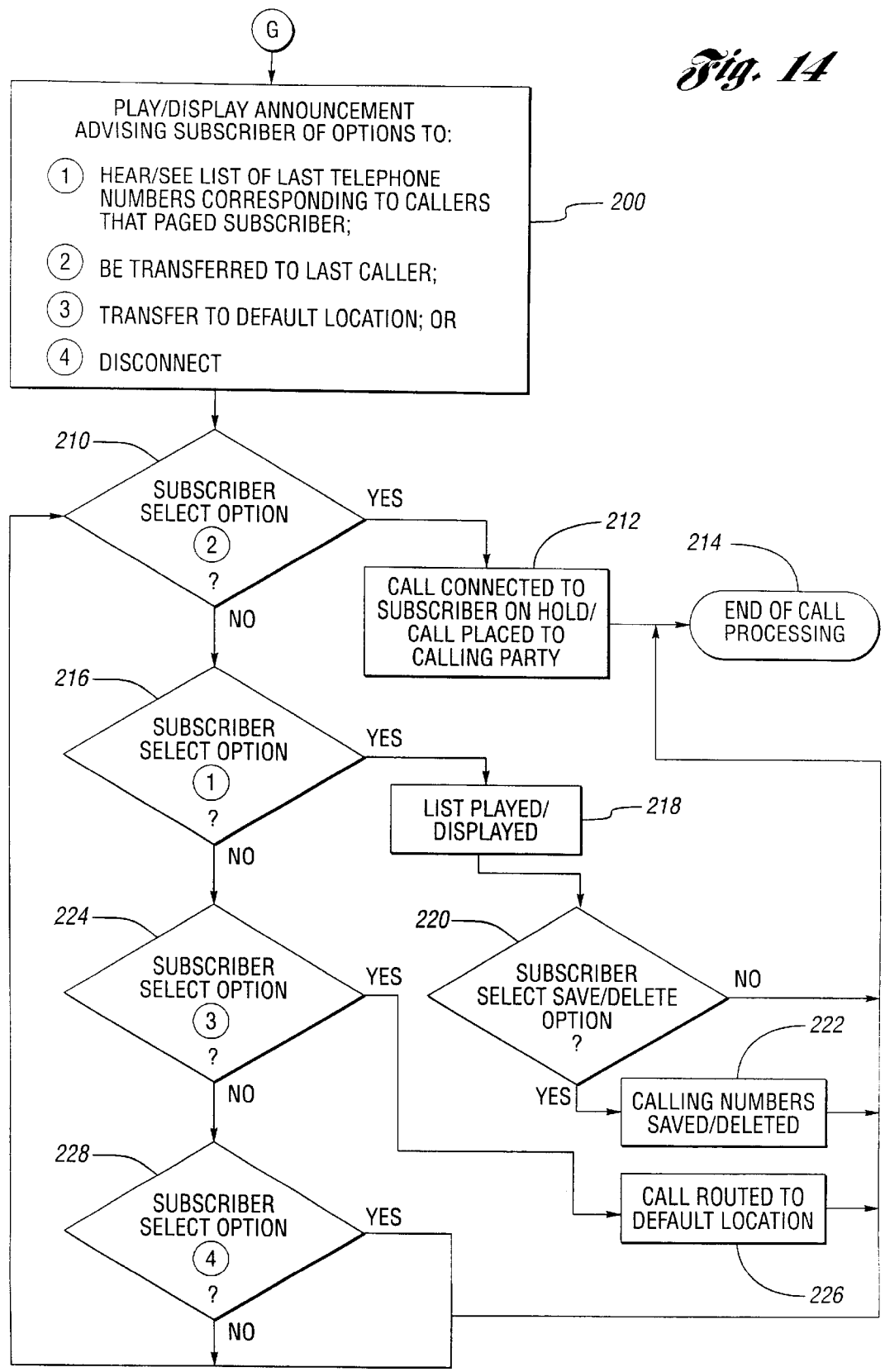

This functionality may be described in further detail with reference to FIGS. 13–14. As shown at block 180, the subscriber dials the FindMe$^{SM}$ paging number whereupon a welcome announcement is played/displayed 182 requesting the subscriber to enter her Service Number and Security Code. The entered Service Number and Security Code are compared 184 with the user's Service Profile. More specifically, the entered Service Number and Security Code are cross-referenced with the subscriber's telephone number and the designated Service Number and Security Code in the subscriber's Service Profile. If the Service Number is incorrect, as determined at decision block 186, an announcement is played/displayed 188 requesting the subscriber to enter her proper Service Number. If, as determined at decision block 190, the subscriber failed to enter the proper Service Number within a specified number of attempts, call processing is discontinued 192.

If the Service Number entered is correct, as determined by decision block 186, it is next determined at decision block 194 whether the Security Code is correct. As in the case of the Service Number, if the Security Code is not correct, an announcement will be played/displayed 196 requesting the subscriber to enter the proper Security Code. If, as determined at decision block 198, the subscriber fails to enter the Security Code within a specified number of attempts, call processing is discontinued 192.

If the security code entered is correct and is further entered within the specified number of attempts, the subscriber will automatically be connected to the caller. If more than one caller has been placed on hold, i.e., a queue, the subscriber will be connected to the first caller placed on queue. At the completion of the call, the subscriber will automatically be connected to the next caller placed on queue, etc. The queuing process is a first-in-first out (FIFO) process such that callers will be connected to the subscriber in order of the time they have been placed on hold. Of course, it is anticipated that alternative selection means may be implemented such that callers placed on queue will be automatically connected to the subscriber in accordance with some other predetermined priority. For example, calls from an office or home may be identified and assigned a special priority so that they are first connected to the subscriber even if placed on queue after another call.

In contrast to the above-described ACP connection version of FindMe$^{SM}$ paging, the ACP basic version does not allow the subscriber to be connected directly to the caller. Instead, a separate call may be placed directly by the system to the calling party. The ACP connection version will also place a separate call to the calling party in the event that the calling party hung-up and all other calls on queue, if any, have been connected to the subscriber and completed. FIG. 14 of the drawings illustrates the logic flow in these events. As shown, an announcement is played/displayed 200 advising the subscriber of his or her options to: (1) be provided a list of the last n telephone numbers corresponding to callers that paged the subscriber; (2) be transferred to the last caller; (3) transferred to a Default Location; or (4) disconnect the call. If it is determined at decision block 210 that the subscriber selects option 2, the call is connected to the subscriber as indicated at 212 and call processing is discontinued 214.

If the subscriber selects option 1, as determined at decision block 216, the list of the last n telephone numbers is provided 218 and a decision is made at 220 whether the subscriber desires to save or delete selective telephone numbers. If this option is declined, call processing is discontinued 214. If, however, the option is elected, selected calling numbers are saved/deleted 222 through appropriate message interchanges and, thereafter, call processing is discontinued 214.

At decision block 224, it is determined if the subscriber has selected option 3 and, if so, the call is routed to the Default Location 226 and call processing is discontinued 214. At decision block 228, option 4 is the only remaining selection, and the system may be set to select this option as a default and call processing may be discontinued 214. Alternatively, if the subscriber fails to select any of the options, the logic flow may be repeated as shown.

Figure 15:
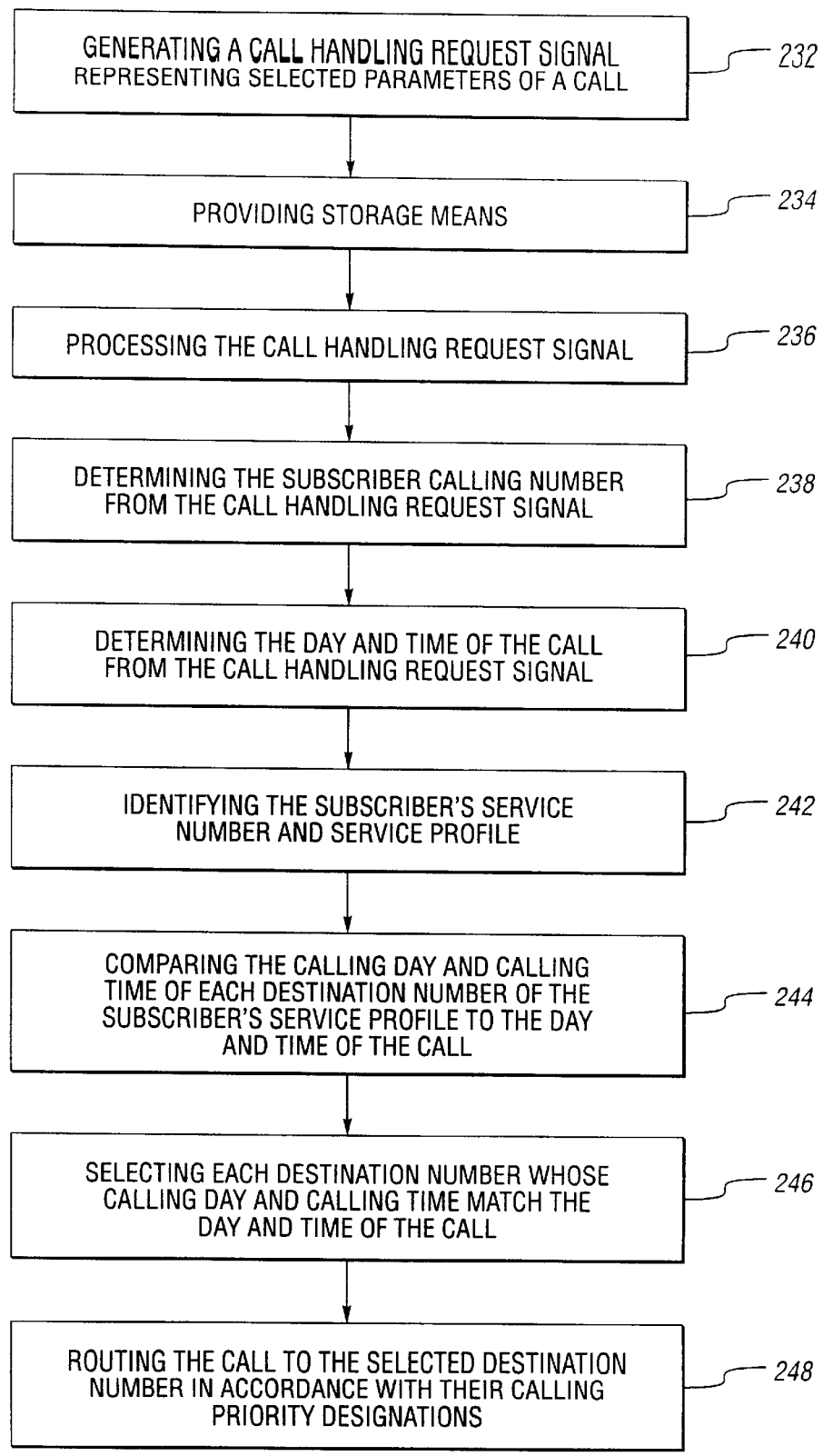
FIG. 15 is a block diagram of the automated method of the architecture of FIG. 2.

Turning now to FIG. 15, there is provided a simplified block diagram of the automated call handling steps of the present invention (incoming calls) as implemented on the architecture of FIG. 2. The method comprises generating 232 a call handling request signal representing selected parameters of a call (i.e., the message from the ISP to the ISCP).

The method further comprises providing 234 storage means such as a database in communication with the ISCP.

The storage means is operative to store a unique Service Number for each of a plurality of subscriber Calling Numbers as well as a corresponding Service Profile (call forwarding profile). Each Service Profile comprises a plurality of Destination Numbers, each of which is assigned a calling day, a calling time, and a calling priority designation.

The call handling request signal is processed 236, preferably at an ISCP, to generate a list of destination numbers to route the call to as well as a corresponding routing order for the day and time the call is placed. This processing further comprises determining 238 the subscriber Calling Number from the call handling request signal—through ANI. The processing further comprises determining 240 the day and time of the call from the call handling request signal.

The Service Number and Service Profile corresponding to the subscriber calling number are identified 242 and, thereafter, the calling day and calling time of each Destination Number of the Service Profile is compared 244 to the day and time of the call. Finally, the processing includes selecting 246 each Destination Number whose calling day and calling time match the day and time of the call.

The method concludes by routing 248 the call to the selected Destination Numbers in accordance with their calling priority designations. In keeping with is the invention, the method steps of generating, providing, processing and routing are performed via components of the AIN. Preferably, the step of generating a call handling request signal is performed by an ISP and the step of processing the call handling request signal and the subscriber call forwarding profile is performed by an ISCP.

Figure 16:
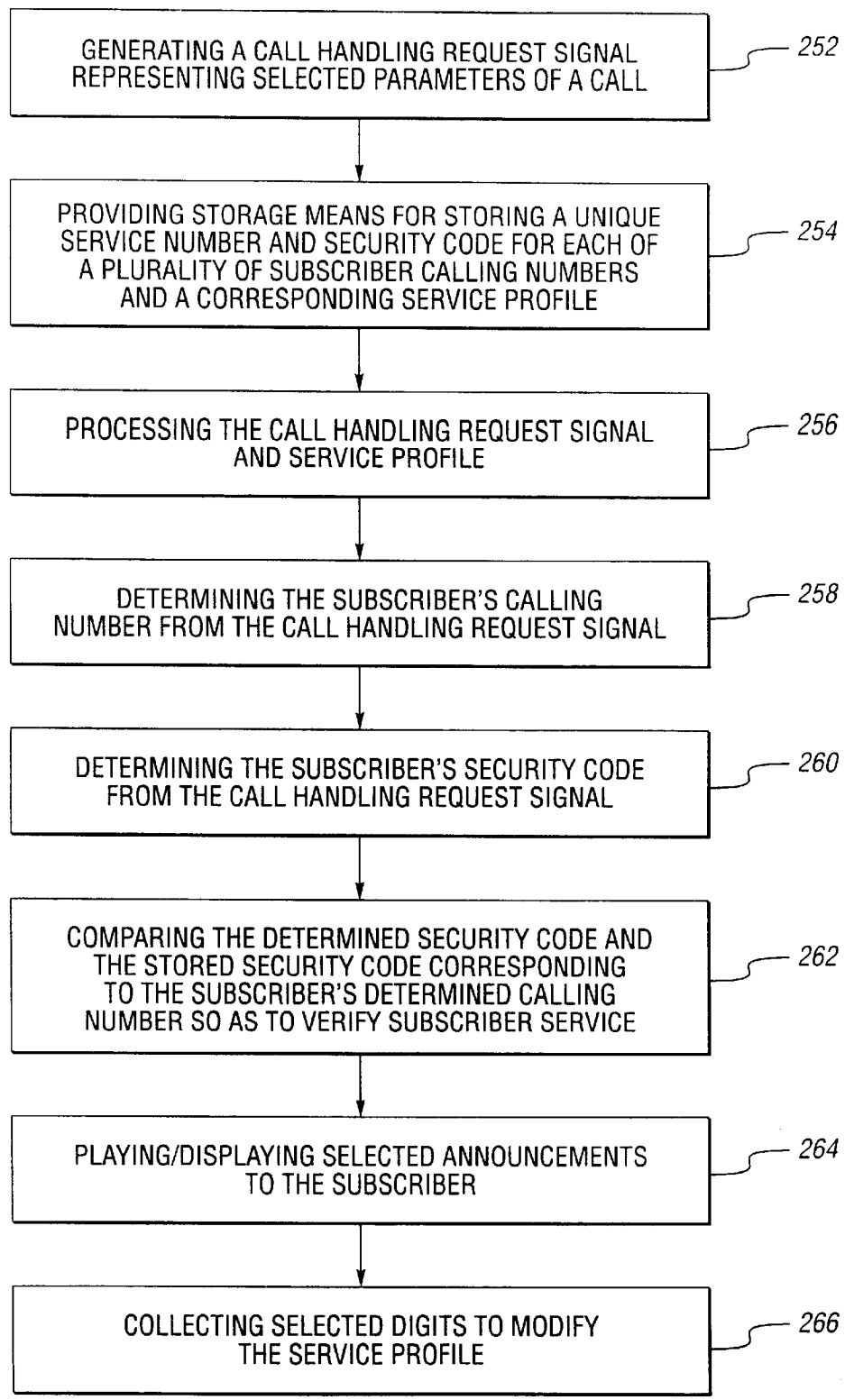
FIG. 16 is a block diagram of the automated method of the architecture of FIG. 5.

FIG. 16 is a block diagram of the automated call handling steps of the present invention (subscriber profile modification) as implemented on the architecture of FIG. 5. As shown, the method similarly comprises generating 252 a call handling request signal representing selected parameters of the call. The method further comprises providing 254 storage means, preferably within or associated with an ISCP, for storing a unique Service Number and Security Code for each of a plurality of subscriber calling numbers as well as a corresponding Service Profile. The call handling request signal is processed 256 to locate the corresponding Service Profile. In keeping with the invention, this processing further comprises determining 258 the subscriber's calling number from the call handling request signal and determining 260 the subscriber's Security Code from the call handling request signal. Still further, the processing comprises comparing 262 the determined Security Code to the stored Security Code corresponding to the subscriber's determined Calling Number so as to verify the subscriber's service. Selected announcements are played/displayed 264 to the subscriber and selected digits are collected 266 to modify the Service Profile. Again, the steps of generating, providing, processing, playing, and collecting are performed via components of the AIN.

While the best modes for carrying out the invention has been described in detail, those familiar with the art to which this invention relates will recognize various alternative designs and embodiments for practicing the invention as defined by the following claims.

What is claimed is:

1. For use in an Advanced Intelligent Network (AIN) provided with, for each subscriber, (a) a subscriber Service Number, (b) a subscriber Calling Number, and (c) a subscriber Call Forwarding Profile including a plurality of Destination Numbers each assigned a calling day, a calling time, and a calling priority designation, an automated call handling method for enabling a caller to dial a single telephone number and reach a subscriber at one of a plurality of separate locations, comprising:

generating a call to a subscriber by dialing a subscriber Service Number;

processing the call to determine the calling day and the calling time of the call and the subscriber Service Number;

processing the subscriber Service Number to identify the subscriber Call Forwarding Profile corresponding to the subscriber Service Number to generate (a) a list of Destination Numbers to route the call, and (b) a corresponding routing order with respect to the calling day and the calling time of the call;

comparing the calling day and the calling time of each Destination Number of the subscriber Call Forwarding Profile to the calling day and the calling time of the call;

selecting each Destination Number whose calling day and calling time match the calling day and the calling time of the call; and sequentially routing the call to the selected Destination Numbers in accordance with their calling priority designations.

2. The method of claim 1, wherein sequentially routing the call to the selected Destination Numbers is performed by an Intelligent Services Peripheral (ISP).

3. The method of claim 1, wherein processing the subscriber Service Number to identify the subscriber Call Forwarding Profile is performed by an Integrated Services Control Point (ISCP).

4. The method of claim 1, wherein generating a call to a subscriber by dialing a subscriber Service Number comprises:

dialing a subscriber Calling Number; and translating the subscriber Calling Number to the subscriber Service Number by using Call Forward Don't Answer (CDFA) functionality.

5. For use in an Advanced Intelligent Network (AIN), an automated call handling system for enabling a caller to dial a single telephone number and reach a subscriber at one of a plurality of separate locations, comprising:

a telephone for enabling a caller to call a subscriber by dialing a subscriber Service Number;

storage for storing, for each subscriber, (a) a subscriber Service Numbers, (b) a subscriber Calling Number, and (c) a subscriber Call Forwarding Profile including a plurality of Destination Numbers each assigned a calling day, a calling time, and a calling priority designation;

an Intelligent Services Control Point (ISCP) operable with the telephone for processing the call to determine the calling day and the calling time of the call and the subscriber Service Number, the ISCP being further operable with the storage to identify the subscriber Call Forwarding Profile corresponding to the subscriber Service Number to generate (a) a list of Destination Numbers to route the call, and (b) a corresponding routing order with respect to the calling day and the calling time of the call, wherein the ISCP compares the calling day and the calling time of each Destination Number of the subscriber Call Forwarding Profile to the calling day and the calling time of the call;

to select each Destination Number whose calling day and calling time match the calling day and the calling time of the call; and an Intelligent Services Peripheral (ISP) operable with the ISCP to sequentially route the call to the selected Destination Numbers in accordance with their calling priority designations.

6. The system of claim 5 further comprising:

a switch operable with the telephone for enabling a caller to call a subscriber by dialing a subscriber Calling Number, wherein the switch translates the subscriber Calling Number to the subscriber Service Number for processing by the ISCP.

7. For use in an Advanced Intelligent Network (AIN) provided with, for each subscriber, (a) a subscriber Service Number, (b) a subscriber Calling Number, (c) a subscriber Service Profile including a plurality of Destination Numbers each assigned a calling day, a calling time, and a calling priority designation, and (d) a Security Code, an automated method for enabling a subscriber to update a subscriber Service Profile, comprising:

generating a call by dialing a subscriber Service Number and a Security Code; processing the call to determine the subscriber Service Number and the Security Code;

processing the subscriber Service Number to locate the corresponding subscriber Service Profile;

comparing the Security Code to the stored Security Code corresponding to the subscriber Service Number to verify subscriber service; and playing selected announcements to the subscriber and collecting selected digits so as to modify the subscriber Service Profile.

8. For use in an Advanced Intelligent Network (AIN), an automated system for enabling a subscriber to update a subscriber Service Profile, comprising:

a telephone for enabling a subscriber to make a call by dialing a subscriber Service Number and a Security Code;

storage for storing for each subscriber, (a) a subscriber Service Numbers, (b) a subscriber Calling Number, (c) a subscriber Service Profile, and (d) a Security Code; and an Integrated Services Control Point (ISCP) operable with the telephone and the storage for processing the Service Number to locate the corresponding subscriber Service Profile;

and compare the Security Code to the stored Security Code corresponding to the subscriber Service Number to verify subscriber service;

wherein the ISCP collects digits entered by the subscriber on the telephone so as to modify the Service Profile.

* * * * *